United States Patent [19]

Jaqua

[11] 4,326,377

[45] Apr. 27, 1982

[54] INJECTION SHUT-OFF VALVE FOR REGENERATIVE INJECTION

[75] Inventor: Vance W. Jaqua, Canoga Park, Calif.

[73] Assignee: Rockwell International Corporation, El Segundo, Calif.

[21] Appl. No.: 113,432

[22] Filed: Jan. 18, 1980

[51] Int. Cl.³ .................................................. F02K 9/52
[52] U.S. Cl. .................................... 60/247; 60/258; 60/259
[58] Field of Search .......... 60/201, 258, 259, 247–249; 244/169, 3.23

[56] References Cited

U.S. PATENT DOCUMENTS

| | | | |
|---|---|---|---|
| 2,410,538 | 11/1946 | Walton | 60/201 |
| 2,918,791 | 12/1959 | Greiner | 60/259 |
| 3,011,312 | 12/1961 | Black | 60/259 |
| 3,088,406 | 5/1963 | Horner | 60/247 |
| 3,479,818 | 11/1969 | Strobl | 60/247 |

OTHER PUBLICATIONS

Traynelis et al., "Study of Integrated Control Systems", ASD Tech. Rpt., 61-327, vol. 1, Nov. 1961, Sect. 2.2.

Primary Examiner—Robert E. Garrett
Attorney, Agent, or Firm—H. F. Hamann; Robert M. Sperry

[57] ABSTRACT

A propellant injector for a liquid rocket engine has an injection cylinder and moving piston in the cylinder. The cylinder on one side of the piston opens into the combustion chamber of the engine. The other side of the piston has a coaxial tubular portion projecting therefrom. A pair of valve members have concentric sleeves slidably mounted respectively on the inside and outside surfaces of the tubular portion of the piston. The outer ends of the concentric sleeves and tubular portion extend through an end wall of the injection cylinder. The valves open and close passages extending through the piston by relative axial movement of the sleeves and the piston. Pneumatic actuator means, connected to the outer ends of the sleeves and tubular portion, moves the sleeves axially relative to the piston to open the valves and move the piston toward the end wall of the injection cylinder to force propellant through the passages into the combustion chamber.

8 Claims, 1 Drawing Figure

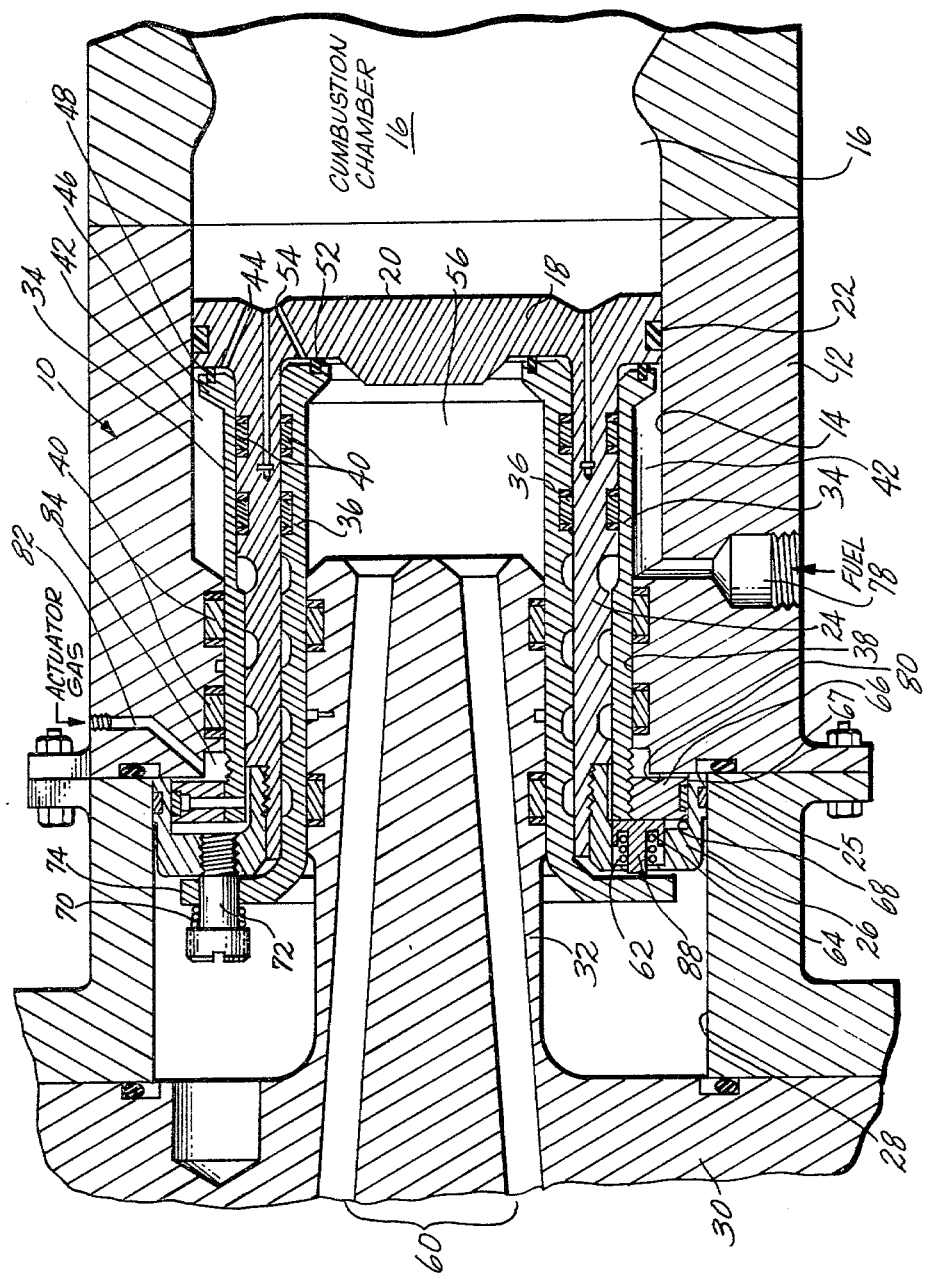

INJECTION SHUT-OFF VALVE FOR REGENERATIVE INJECTION

FIELD OF THE INVENTION

This invention relates to liquid rocket propulsion systems and, more particularly, is concerned with a regenerative actuation system for injecting propellant into the combustion chamber of a rocket engine.

BACKGROUND OF THE INVENTION

In co-pending application Ser. No. 3,324 filed Jan. 15, 1979, in the name of Harold S. Stratton and assigned to the same assignee as the present application, there is described a propulsion system using liquid propellant in which propellant from a relatively lowpressure source is injected into the combustion chamber at a high pressure by a regenerative arrangement which utilizes the pressure in the combustion chamber to power the injection mechanism. The present invention is an improvement on the injector mechanism therein described which also utilizes the combustion pressure to provide the injection pressure. However, the present invention provides much more precise control of the quantity of propellant injected as well as more precise control of the time interval over which the fuel is injected, resulting in a more fuel-efficient operation of the propulsion system.

SUMMARY OF THE INVENTION

The present invention provides a regenerative propellant injection system for a rocket engine in which the propellant is injected into the combustion chamber of the rocket engine in a series of precise pre-measured quantities. The A multi-pulse engine using bipropellants is provided in which the start of each regenerative pulse cycle is externally timed and controlled. Thus, by controlling the rate and number of injection cycles in a series, very accurate repeatable rocket performance results are possible.

This is achieved, in brief, by providing means forming a cylindrical passage closed at one end and opening at the other end into the combustion chamber of the rocket engine. A piston, freely movable in the cylindrical passage, in combination with the closed end of the cylindrical passage forms an injection chamber into which propellant is fed under relatively low pressure. Orifices in the piston direct propellant from the injection chamber into the combustion chamber. Valves in the piston normally close the orifices so that pressure of the propellant in the injection chamber moves the piston toward the combustion chamber. Actuating means, preferably in the form of a pneumatic piston, opens the valves and urges the piston away from the combustion chamber, squeezing the propellant out of the injection chamber into the combustion chamber where it is ignited. The pressure built up of the ignited fuel drives the piston in the direction away from the combustion chamber forcing all the propellant out of the injection chamber through the orifices. The area of the piston exposed to the propellant in the injection chamber is less than the area exposed to the combustion chamber, resulting unit pressure multiplication by which the propellant is forced out through the orifices. The valves are normally closed by spring means, but are forced open by actuating means.

BRIEF DESCRIPTION OF THE DRAWINGS

For a more complete understanding of the invention reference should be made to the accompanying drawing, wherein the single FIGURE is a cross-sectional view of the preferred embodiment of the present invention.

DETAILED DESCRIPTION

Referring to the drawing in detail, 10 indicates generally a rocket engine assembly. The rocket engine includes a main engine block 12 having a cylindrical bore 14 opening into a combustion chamber 16. A piston 18 is movable within the cylindrical bore 14, the outer face 20 of the piston 18 forming the end wall of the combustion chamber 16. An annular gasket ring 22 provides a sliding seal between the piston and the bore. The piston 20 includes a hollow cylindrical or annular portion 24 which projects from the back of the piston. The portion 24 terminates at its outer end in a flange member 26, which preferably is made of a separate piece to facilitate assembly and is threadedly attached to the outer end of annular portion 24 of the piston 18. An outer cylindrical surface 25 of the flange portion 26 slidably engages and is guided by a cylindrical bore 28 in the engine body 12 that is coaxial with but of larger diameter than the bore 14. It should be noted that for ease of assembly, the main engine body 12 may be assembled from a plurality of separately machined sections which are then bolted or otherwise secured together. The engine body 12 includes an end section 30 which seals off the end of the bore 28. The end section 30 includes a plunger 32 which projects into the interior space within the annular portion 24 of the piston 18.

An outer cylindrical sleeve 24 is slidably positioned on the outside of the annular portion 24 of the piston while an inner cylindrical sleeve 36 is slidably positioned on the inside of the annular portion 24. The outer cylindrical surface of the outer sleeve 34 is in sliding contact with a cylindrical bore 38 in the rocket engine body 12 which is between and coaxial with the bores 14 and 28 but of slightly smaller diameter than the cylindrical bore 14. The inner cylindrical surface of the inner sleeve 36 is in sliding contact with the plunger 32. Annular gaskets, such as indicated at 40, provide pressure seals at the interfaces between the various sliding surfaces of the inner and outer sleeves.

The outer sleeve 34 operates as a valve for controlling the flow of fuel from an annular fuel injection chamber 42 to the combustion chamber 16 through an orifice 44 formed by a small passage through the piston. The sleeve 34 has an outwardly projecting flange portion 46 which supports an annular gasket 48 that engages the back surface of the piston 18 at a distance radially outside the orifice 44, sealing off the orifice 44 from the fuel injection chamber 42. Thus the outer sleeve 34 forms a valve which is open and closed by relative motion of the outer sleeve 34 and the piston 18. Fuel is directed into the fuel injection chamber 42 through fuel passage 78.

Similarly, the inner sleeve 36 terminates in an inwardly directed flange portion 50 which supports an annular sealing ring 52 having a radius that is inside an orifice 54 formed by a small passage extending through the piston. Thus the inner sleeve 36 operates as a valve for opening and closing the orifice 54 by relative movement of the inner sleeve 36 relative to the piston 18. The region between the back of the piston and the end of the plunger 32 forms an oxidizer injection chamber 56. The oxidizer is directed into the injection chamber 56 through passages 60 extending through the plunger 32.

The outer sleeve is normally urged toward the back of the piston 18 by a group of compression springs, one of which is indicated at 62. The compression spring is seated in a counterbore in the flange portion 26 of the piston. It urges a cup-shaped member 64 against the end of the outer sleeve 34 and associated flange member 66 in a direction away from the flange member 26, thus forcing the valve formed by the outer sleeve 34 to the closed position. The annular flange member 66 is threadedly secured to the end of the outer sleeve 34. The outer cylindrical perimeter 67 of the flange section 66 slidably engages the inner cylindrical surface 68 of a lip on the flange member 26 associated with the piston 18.

The inner sleeve 36 is also urged to the closed position by a group of compression springs, one of which is indicated at 70. One end of the spring 70 engages the head of a bolt 72 which extends through a hole in a flange portion 74 projecting radially outwardly from the end of the inner sleeve 36. The bolt 72 threads into the flange portion 26 of the piston 18. It will be understood that, while only one spring 62 and one spring 70 are shown in the drawing, a group of such springs may be provided which are angularly spaced around the respective flanges.

The operation of the rocket engine as described above, is as follows. A propellant fuel under relatively low pressure is forced into the fuel injection chamber 42 through the fuel inlet passage 78 connected to a liquid propellant source (not shown). At the same time a liquid oxidizer is admitted under pressure into the oxidizer injection chamber 56 through the passages 60. The pressure of the fuel and oxidizer forces the piston to the right as viewed in the FIGURE, bringing the lip of the flange member 26 against an abutment formed by a shoulder 80 in the rocket engine body 12. With both valves formed by the sleeves 34 and 36 closed, no fuel or oxidizer is admitted into the combustion chamber 16.

To initiate a combustion cycle, an inert activator gas is admitted under pressure through a passage 82 to an annular space 84 between the abutment 80 and the flange member 66. Pressure of the actuator gas forces the outer sleeve 34 to the left as viewed in the FIGURE, opening the valve and allowing fuel to escape from the fuel injection chamber 42 through the orifice 44 into the combustion chamber 16. The movement of the flange member 66 forces the cup member 64 to the left, compressing the spring 62. At the same time a center shaft 88 of the cup member is forced against the flange portion 74 of the inner sleeve 36, causing the inner sleeve 36 to move to the left relative to the piston 18. Thus the valve is opened between the oxidizer injection chamber 56 and the orifice 54. Once the valves are fully opened, the piston is also moved to the left by the pressure of the actuator gas, causing the fuel and oxidizer to be injected into the combustion chamber 16. The difference in area of each of the valves, when open, subject to the pressure in the injection chamber causes the valves to remain open against the urging of the springs.

As the fuel and oxidizer are mixed in the combustion chamber, combustion of the mixture takes place causing the pressure in the combustion chamber to increase rapidly. Because the effective area of the front surface 20 of the piston is greater than the surface area of the backside of the piston by the amount of the cross-sectional area of the annular portion 24, there is a pressure amplification produced which results in the piston 18 moving to the left, forcing the fuel and oxidizer out of the respective injector chambers 42 and 56 into the combustion chamber. Check valves (not shown) are provided in the lines to the fuel passage 78 and the oxidizer passages 60 to prevent backflow of the fuel and oxidizer out of their respective injector chambers. The valves remain open until movement of the piston 20 is interrupted by engagement with the end of the plunger 32. This stops the injection of fuel into the combustion chamber. As the pressure rapidly drops in the combustion chamber with the loss of fuel, the springs 62 and 70 close the valves. With the actuator gas supply cut off and the annular space 84 vented, the piston 18 returns to the starting position by the flow of a new charge of fuel and oxidizer into their respective injection chambers 42 and 56. The rocket engine assembly is thus primed for another cycle of operation.

From the above description it will be seen that the amount of fuel and oxidizer injected into the combustion chamber is very accurately controlled by the volume displaced by the movement of the piston 18 between its two limits. The spring-loaded sleeve valves insure that there is no leakage of fuel and oxidizer into the combustion chamber during the loading of the injection chambers 42 and 56. It will be noted that when the valves are in the closed position, the pressure of the oxidizer and fuel in the injection chambers acts on the flange portions 46 and 50 of the sleeves 34 and 36 to hold the valves in a closed condition since the piston 18 cannot move to the right once the flange 26 engages the shoulder 80. Once the valves are opened by the actuator gas, the net effect of the pressure of these fluids is in the opposite direction, tending to hold the valves open against the force of the springs 62 and 70. The pressure in the injection chamber rises rapidly during the combustion period because the combustion piston 18 is driven to the left. The differential pressure across the flanged ends of the sleeve valves 34 and 36 is sufficient to hold the valves open against the action of the springs. As the pressure in the combustion chamber subsides and the piston reaches the left end of its stroke, the pressure of the fuel and oxidizer drops back to the relatively low pressure induced by the source of the oxidizer and fuel. At this pressure level, the springs are sufficiently strong to force the valves into the closed position, the pressure of the oxidizer and fuel then pushing the piston 18 to the right in position to repeat the combustion cycle.

It will be understood that while gas has been shown as the actuator for initiating a combustion cycle, other mechanical or hydraulic means could be provided for initially opening the valves, for example, an electric solenoid.

In addition, numerous other variations and modifications may obviously be made without departing from the present invention. Accordingly, it should be clearly understood that the forms of the present invention described above and shown in the accompanying drawing are illustrative only and are not intended to limit the scope of the present invention.

What is claimed is:

1. A regenerative fuel injection system for injecting propellant into the combustion chamber of a fluid-fueled rocket engine, comprising:
    means forming a cylindrical passage closed at one end and adapted to open into the combustion chamber at the other end; a piston movable in the cylindrical passage; the piston and closed end of the passage forming an injection chamber; a portion of the piston extending through an opening in the closed end of the passage, said portion reducing the effective area of the piston in the injection chamber relative to the effective area of the piston in the combustion chamber; means forming an orifice connecting the injection chamber to the combustion chamber; valve means for controlling fluid flow through the orifice; means holding the valve means closed in response to higher fluid pressure in the injection chamber than the combustion chamber; and actuator means for momentarily opening the valve means against the fluid pressure in the injection chamber to release propellant into the combustion chamber, said actuator means including a first member supported for movement parallel to the axis of movement of said piston, means connecting said member to the valve means for opening the valve means, the first member engaging the piston when the member is moved to the valve open position, and drive means forcing said first member into engagement with the piston and the piston and drive member as a unit away from the combustion chamber toward the injection chamber to squeeze the propellant fluid out of the injection chamber through the orifice into the combustion chamber.

2. A regenerative fuel injection system for injecting propellant into the combustion chamber of a fluid-fueled rocket engine, comprising:

means forming a cylindrical passage closed at one end and adapted to open into the combustion chamber at the other end; a piston movable in the cylindrical passage; the piston and closed end of the passage forming an injection chamber; a portion of the piston extending through an opening in the closed end of the passage, said portion reducing the effective area of the piston in the injection chamber relative to the effective area of the piston in the combustion chamber; means forming an orifice connecting the injection chamber to the combustion chamber; valve means for controlling fluid flow through the orifice; means holding the valve means closed in response to higher fluid pressure in the injection chamber than the combustion chamber; and actuator means for momentarily opening the valve means against the fluid pressure in the injection chamber to release propellant into the combustion chamber, said actuator means including a first member supported for movement parallel to the axis of movement of said piston, means connecting said member to the valve means for opening the valve means, the first member engaging the piston when the number is moved to the valve open position, drive means forcing said first member into engagement with the piston and the piston and drive member as a unit away from the combustion chamber toward the injection chamber to squeeze the propellant fluid out of the injection chamber through the orifice into the combustion chamber, a second member supported for movement parallel to the axis of movement of said piston, means connecting said second member to the additional valve means for opening the additional valve means, said drive means forcing the second member into the valve open position.

3. Apparatus for injecting propellant into the combustion chamber of a rocket engine, comprising:

an injection cylinder, a moving piston in the injection cylinder having a passage therethrough, one end of the cylinder being in fluid communication with the combustion chamber, and end wall means closing the other end of the injection cylinder, the end wall means having a cylindrical plunger projecting into the injection cylinder and forming an annular space surrounding the plunger, the piston having a tubular portion extending into said annular space from one side of the piston, valve means including a cylindrical sleeve concentrically positioned between and in sliding contact with the tubular portion of the piston and the plunger, the valve means further including a flange on one end of the sleeve engaging said one side the piston and closing off said passage through the piston, means directing propellant into the space between the piston and the plunger, and actuator means simultaneously moving the valve sleeve and flange away from said one side of the piston to open the passage and urging the piston toward the plunger, whereby the propellant is forced through the passage into the combustion chamber.

4. Apparatus of claim 3 further including spring means normally urging the flange of the valve means against said one side of the piston to close the passage.

5. Apparatus of claim 3 wherein the actuator means includes a pneumatic piston member engaging the sleeve for urging the sleeve away from the piston, limit means limiting the movement of the sleeve relative to the piston when the limit means is engaged, said limit means causing the pneumatic piston member to move the piston and sleeve as a unit when the limit means is engaged.

6. Apparatus of claim 3 wherein the piston has an additional passage therethrough and further including second valve means including a sleeve concentric with and slidable on the tubular portion of the piston, the sleeve of the second valve means being positioned between the tubular portion and the injection cylinder, the sleeve of the second valve means being of smaller diameter than the injection cylinder to form an annular space between the sleeve and the injection cylinder, the second valve means including a flange on one end of the sleeve engaging said one side of the piston and closing off said additional passage through the piston, said actuator means moving the sleeve and flange relative to the piston to open the second valve means.

7. Apparatus of claim 7 further including spring means normally urging the flange of the second valve means against said one side of the piston to close the additional passage.

8. An injection valve for injecting propellant into a combustion chamber, comprising:

means providing an injection cylinder, a piston slidable in the injection cylinder, one end of the injection cylinder being in fluid communication with the combustion chamber, a tubular member projecting from and integral with the opposite end of the piston and having inner and outer cylindrical surfaces concentric with and of lesser diameter than the piston, a first valve having a sleeve slidably mounted on the outer surface of a tubular member, a second valve having a sleeve slidably mounted on the inside surface of the tubular member, the piston having at least two passages extending between the two ends of the piston, the first valve opening and closing one passage and the second valve opening and closing the other passage when the respective valve sleeves are moved axially relative to the tubular member, means forming a sealed end wall through which the tubular portion of the piston and concentric sleeves of the valves extend outside the injection cylinder, means directing propellant into the spaces between the sealed end wall and the piston for urging the piston in one direction, stop means secured to the piston and engaged by the valve sleeves when the sleeves are moved relative to the piston when the valves are opened, and actuator means moving the sleeves into engagement with the stop means to open the valves and move the piston away from said end of the injection cylinder in fluid communication with the combustion chamber.

* * * * *